United States Patent
Laor et al.

(10) Patent No.: US 8,972,780 B2
(45) Date of Patent: Mar. 3, 2015

(54) LOW-LATENCY FAULT-TOLERANT VIRTUAL MACHINES

(71) Applicants: Dor Laor, Tel Aviv (IL); Orit Wasserman, Mitzpe Aviv (IL)

(72) Inventors: Dor Laor, Tel Aviv (IL); Orit Wasserman, Mitzpe Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 219 days.

(21) Appl. No.: 13/756,159

(22) Filed: Jan. 31, 2013

(65) Prior Publication Data

US 2014/0215461 A1 Jul. 31, 2014

(51) Int. Cl.
*G06F 11/07* (2006.01)
*G06F 9/455* (2006.01)

(52) U.S. Cl.
CPC .................................. *G06F 9/45533* (2013.01)
USPC ................ 714/10; 714/4.11; 714/6.3; 714/13

(58) Field of Classification Search
CPC ............ G06F 11/2023; G06F 11/2025; G06F 11/2028; G06F 11/203; G06F 11/2033
USPC .............................................. 714/10, 4.11, 13
See application file for complete search history.

(56) References Cited

U.S. PATENT DOCUMENTS

| | | | |
|---|---|---|---|
| 7,100,006 B2 * | 8/2006 | Durrant et al. ................. | 711/162 |
| 8,805,788 B2 * | 8/2014 | Gross et al. .................... | 707/649 |
| 2010/0211829 A1 * | 8/2010 | Ziskind et al. ................... | 714/48 |
| 2010/0280996 A1 * | 11/2010 | Gross et al. .................... | 707/649 |
| 2010/0332889 A1 * | 12/2010 | Shneorson et al. .............. | 714/2 |
| 2011/0093849 A1 * | 4/2011 | Chawla et al. ..................... | 718/1 |
| 2011/0209146 A1 * | 8/2011 | Box et al. .......................... | 718/1 |
| 2012/0151474 A1 * | 6/2012 | Biran et al. ....................... | 718/1 |
| 2012/0233331 A1 * | 9/2012 | Voccio et al. .................. | 709/226 |
| 2012/0311344 A1 * | 12/2012 | Sabin et al. .................... | 713/189 |
| 2013/0205106 A1 * | 8/2013 | Tati et al. ....................... | 711/159 |
| 2013/0232491 A1 * | 9/2013 | Radhakrishnan et al. ........ | 718/1 |
| 2014/0130040 A1 * | 5/2014 | Lemanski .......................... | 718/1 |
| 2014/0244950 A1 * | 8/2014 | Baron et al. ..................... | 711/162 |
| 2014/0244951 A1 * | 8/2014 | Baron et al. ..................... | 711/162 |

\* cited by examiner

*Primary Examiner* — Chae Ko
(74) *Attorney, Agent, or Firm* — Lowenstein Sandler LLP (57) ABSTRACT

A system and method are disclosed for managing a plurality of virtual machines (VMs) in a fault-tolerant and low-latency manner. In accordance with one example, a computer system executes a first VM and a second VM, and creates a first live snapshot of the first VM and a second live snapshot of the second VM. The computer system detects, after the creating of the first live snapshot and the second live snapshot, a failure that affects the executing of the first VM, and in response destroys the first VM and the second VM, creates a third VM from the first live snapshot and a fourth VM from the second live snapshot, and initiates execution of the third VM and the fourth VM. An output transmitted by the first VM to the second VM during the creating of the first live snapshot and the second live snapshot is not blocked.

20 Claims, 4 Drawing Sheets

LOW-LATENCY FAULT-TOLERANT VIRTUAL MACHINES

TECHNICAL FIELD

This disclosure relates to computer systems, and more particularly, to managing virtual machines in a fault-tolerant and low-latency manner.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps to a device of the host machine (e.g., a network interface device, a CD-ROM drive, etc.). For example, a virtual machine may comprise a virtual disk that is mapped to an area of storage (known as a "disk image") of a particular storage device (e.g., a magnetic hard disk, a Universal Serial Bus [USB] solid state drive, a Redundant Array of Independent Disks [RAID] system, a network attached storage [NAS] array, etc.) The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and methods by which a computer system may manage a plurality of virtual machines (VMs) in a fault-tolerant and low-latency manner. In accordance with one example, a computer system manages a plurality of VMs as a group, creating live snapshots of all the VMs of the group at various points in time (e.g., periodically, in response to events, etc.). A snapshot of a virtual machine is a file that captures the entire state of the virtual machine at a particular point in time. A live snapshot of a virtual machine is a snapshot that is taken while the VM is executing (i.e., a snapshot that is taken without first shutting down the VM). The live snapshots serve as a series of "backups" of the virtual machines, such that a VM that is affected by a failure (e.g., a hardware failure, a hypervisor failure, etc.) can be recreated from the most recent live snapshot.

Because creating a live snapshot of a VM does not happen instantaneously, there is a delay between the issuing of a command to create the live snapshot and the completion of its creation (which may be signalled, for example, by an acknowledgement message). If outputs from the virtual machine are not blocked during this delay (i.e., while the VM is being snapshotted), these outputs may be observed by another entity (another VM, another computer system, etc.), and in case the live snapshot is not successfully created, the VM may be rolled back to its pre-snapshot state. In such cases, the VM state is as though the outputs never occurred, while the external entity operates as though the outputs did in fact occur, which can lead to inconsistencies. This same problem can occur when outputs from the VM are not blocked between the taking of live snapshots. For example, if a host dies after a live snapshot of a VM is taken and before the next live snapshot is taken, then the VM may be rolled back to the state of the first live snapshot, and once again any outputs from the VM after the first snapshot that were not blocked may have been observed by another entity. The blocking of VM outputs thus prevents such inconsistencies from occurring, but can increase latency significantly because input/output operations of the VM are suspended between snapshots.

The system and methods of the present disclosure can reduce such latency, without compromising fault tolerance. More particularly, in accordance with one example, multiple virtual machines that may be related are treated as a group (for example, an e-commerce application may include a web server, a database server, and a load balancer, each executing in a separate virtual machine and communicating with each other) and live snapshots are created at the same points in time for all of the VMs in the group. However, rather than blocking all outputs from the VMs in the group between snapshots, outputs that are communicated between virtual machines in the group (e.g., an output transmitted from a first VM in the group to a second VM in the group, etc.) are allowed to occur, and only outputs from a VM in the group to an entity outside the group (e.g., another VM, another computer system, etc.) are blocked. As a result, latency of applications utilizing the group of VMs can be significantly reduced, without compromising fault tolerance or consistency. In contrast, approaches of the prior art typically involve tradeoffs in at least one of latency, fault tolerance, and consistency.

Figure 1:
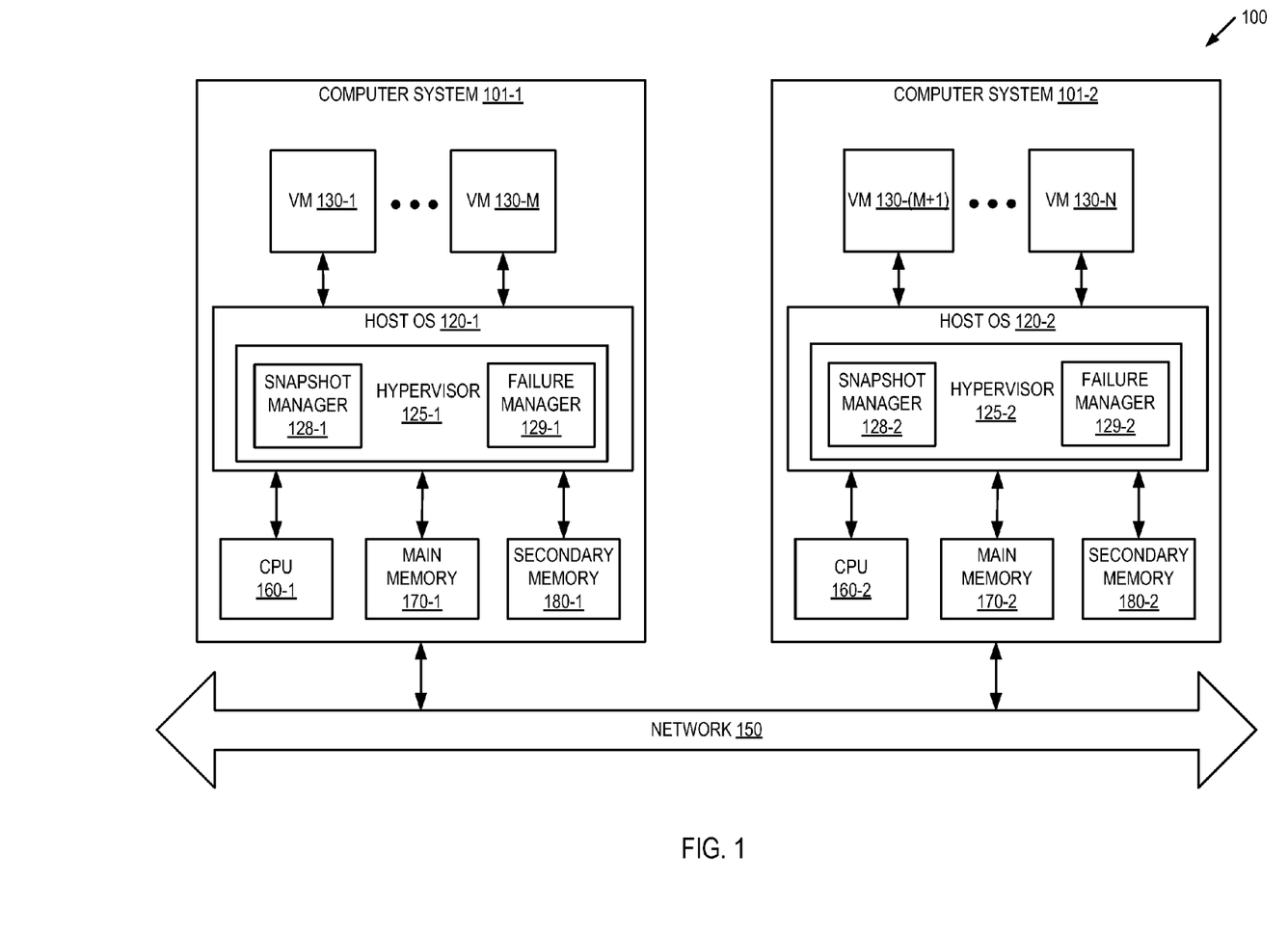
FIG. 1 depicts an illustrative system architecture, in accordance with the present disclosure.

FIG. 1 depicts an illustrative architecture of a computer system 100, in accordance with an example of the present invention. It should be noted that other architectures for computer system 100 are possible, and that examples of a system utilizing the disclosure are not necessarily limited to the specific architecture depicted by FIG. 1.

As shown in FIG. 1, computer system 100 comprises a first computer system 101-1 and a second computer system 101-2 connected via a network 150. Each of computer systems 101-1 and 101-2 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet). In some embodiments, computer systems 101-1 and 101-2 may belong to a cluster comprising additional computer systems not depicted in FIG. 1, while in some other embodiments, computer systems 101-1 and 101-2 may be independent systems that are capable of communicating via network 150.

Each of computer systems 101-1 and 101-2 comprises a central processing unit (CPU) 160, a main memory 170, which may include volatile memory devices (e.g., random access memory (RAM)), non-volatile memory devices (e.g., flash memory), and/or other types of memory devices, and a secondary memory 180 (e.g., one or more magnetic hard disk drives, one or more Universal Serial Bus [USB] solid-state drives, etc.). It should be noted that the fact that a single CPU is depicted in FIG. 1 for each of computer systems 101-1 and 101-2 is merely illustrative, and that in some other examples one or both of computer systems 101-1 and 101-2 may comprise a plurality of CPUs.

Computer system 101-1 runs a host operating system (OS) 120-1 that manages the hardware resources of the computer system and provides functions such as interprocess communication, scheduling, virtual memory management, and so forth. In one example, host operating system 120-1 also comprises a hypervisor 125-1, which provides a virtual operating platform for a group of virtual machines 130-1 through 130-M, where M is a positive integer greater than one, and manages the execution of virtual machines 130-1 through 130-M.

Each virtual machine 130-i, where i is an integer between 1 and M inclusive, is a software implementation of a machine that executes programs as though it were an actual physical machine. In accordance with one example, hypervisor 125-1 includes a snapshot manager 128-1 and a failure manager 129-1. Snapshot manager 128-1 is capable of issuing one or more commands to create live snapshots of virtual machines in a group, blocking outputs from VMs in a group to external targets (e.g., VMs outside the group, a computer system other than computer system 100, etc.) during snapshotting of the VMs, allowing outputs communicated among VMs in a group during snapshotting of the VMs, storing snapshots in memory (e.g., main memory 170-1, secondary memory 180-1, etc.), communicating with snapshot manager 128-2 of computer system 101-2, and checking the liveness of computer system 101-2. Failure manager 129-1 is capable of detecting the occurrence of failures affecting one or more VMs in a group, destroying virtual machines in a group in response to failures, creating a new group of VMs from live snapshots, and initiating execution of the new group of VMs. Some operations of snapshot manager 128-1 are described in detail below with respect to the method of FIG. 2, and some operations of failure manager 129-1 are described in detail below with respect to the method of FIG. 3.

It should be noted that in some alternative examples, hypervisor 125-1 may be external to host OS 120-1, rather than embedded within host OS 120-1. It should further be noted that in some alternative examples, one or both of snapshot manager 128-1 and failure manager 129-1 may be external to hypervisor 125-1 (e.g., modules of host OS 120-1, middleware hosted by computer system 101-1 [not depicted in FIG. 1], etc.). It should further be noted that in some alternative examples, computer system 101-1 may run a plurality of hypervisors, rather than a single hypervisor.

Computer system 101-2, like computer system 101-1, runs a host operating system (OS) 120-2 that manages the hardware resources of the computer system and provides functions such as interprocess communication, scheduling, virtual memory management, and so forth. In one example, host operating system 120-2 also comprises a hypervisor 125-2, which provides a virtual operating platform for a group of virtual machines 130-(M+1) through 130-N, where N is a positive integer greater than M, and manages the execution of virtual machines 130-(M+1) through 130-N.

Each virtual machine 130-i, where i is an integer between M+1 and N inclusive, is a software implementation of a machine that executes programs as though it were an actual physical machine. In accordance with one example, hypervisor 125-2 includes a snapshot manager 128-2 and a failure manager 129-2. Snapshot manager 128-2 is capable of issuing one or more commands to create live snapshots of virtual machines in a group, blocking outputs from VMs in a group to external targets (e.g., VMs outside the group, a computer system other than computer system 100, etc.) during snapshotting of the VMs, allowing outputs communicated among VMs in a group during snapshotting of the VMs, storing snapshots in memory (e.g., main memory 170-2, secondary memory 180-2, etc.), communicating with snapshot manager 128-1 of computer system 101-1, and checking the liveness of computer system 101-1. Failure manager 129-2 is capable of detecting the occurrence of failures affecting one or more VMs in a group, destroying virtual machines in a group in response to failures, creating a new group of VMs from live snapshots, and initiating execution of the new group of VMs. Some operations of snapshot manager 128-9 are described in detail below with respect to the method of FIG. 2, and some operations of failure manager 129-2 are described in detail below with respect to the method of FIG. 3.

It should be noted that in some alternative examples, hypervisor 125-2 may be external to host OS 120-2, rather than embedded within host OS 120-2. It should further be noted that in some alternative examples, one or both of snapshot manager 128-2 and failure manager 129-2 may be external to hypervisor 125-2 (e.g., modules of host OS 120-2, middleware hosted by computer system 101-2 [not depicted in FIG. 1], etc.). It should further be noted that in some alternative examples, computer system 101-2 may run a plurality of hypervisors, rather than a single hypervisor.

Figure 2:
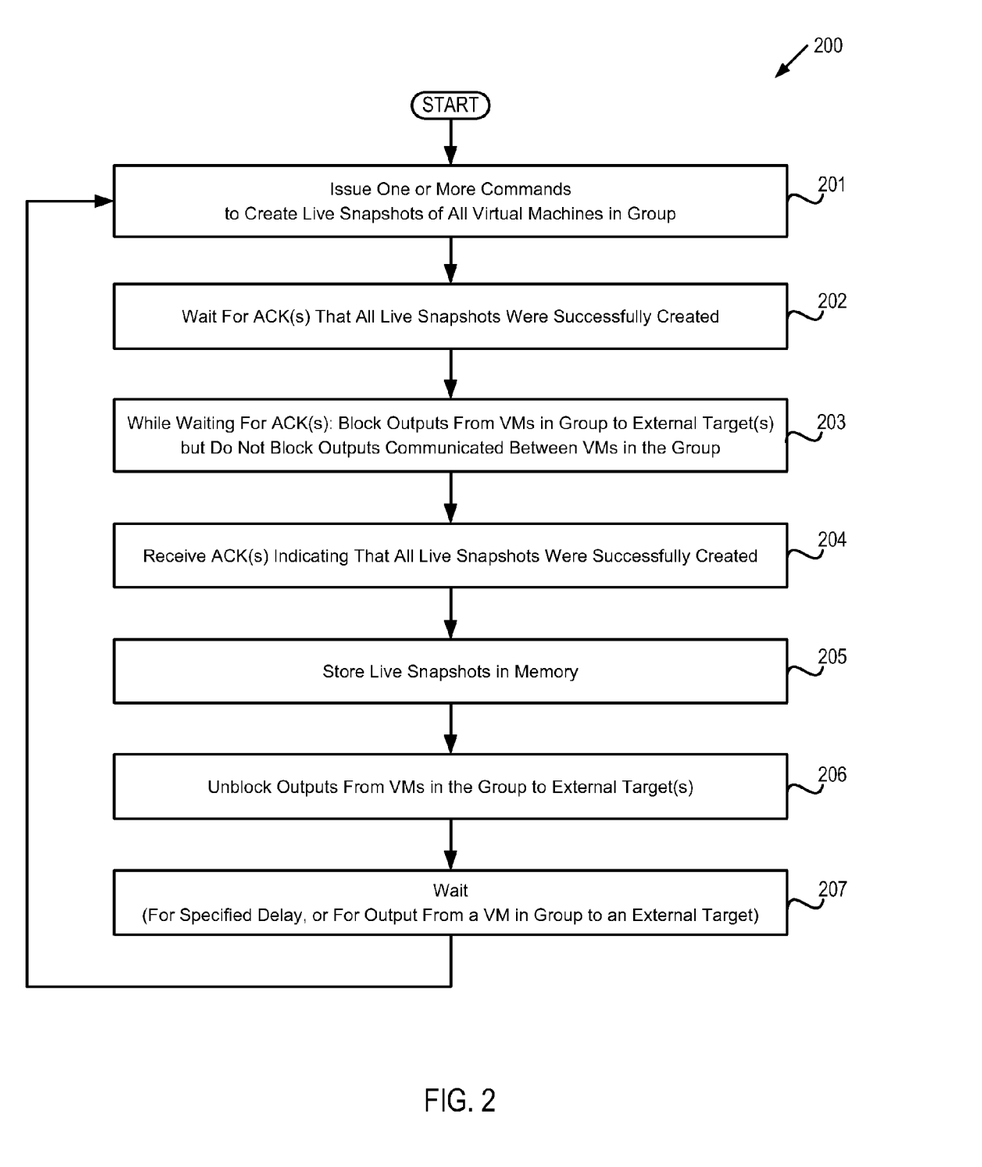
FIG. 2 depicts a flow diagram of one example of a method by which a computer system manages live snapshots of a group of virtual machines.

FIG. 2 depicts a flow diagram of one example of a method 200 by which a computer system manages live snapshots of a group of virtual machines. The method is performed by processing logic that may comprise hardware (circuitry, dedicated logic, etc.), software (such as is run on a general purpose computer system or a dedicated machine), or a combination of both. In one example, the method is performed by the computer system 100 of FIG. 1, while in some other examples, some or all of the method might be performed by another machine. Similarly, in one example the method is performed by snapshot manager 128, while in some other examples, some or all of the method might be performed by some other module of computer system 100. It should be noted that blocks depicted in FIG. 2 can be performed simultaneously or in a different order than that depicted.

At block 201, one or more commands are issued to create live snapshots of all virtual machines 130-1 through 130-N in the group. The command(s) may be performed by computer system 100 (e.g., via hypervisor 125, via host OS 120, etc.) or by another machine not depicted in FIG. 1. The command(s) may be issued by snapshot manager 128 in response to an administrator, or in response to an application executing on computer system 100, or in response to some other program (e.g., a system administration-related script that executes on computer system 100, an application that executes on another machine connected to computer system 100 via network 150, etc.). In one example, snapshot manager 128 may spawn N processes, one for each virtual machine in the group, and each of the processes may issue a respective command to create a live snapshot of the corresponding virtual machine.

In one example, when the secondary memory 180 supports native snapshotting (e.g., a capability by which the storage device can create snapshots), the snapshot manager 128 may issue one or more commands to a native snapshotting module in the secondary memory 180 to create the live snapshots. Alternatively (e.g., when the secondary memory 180 lacks a native snapshotting capability, etc.), the snapshot manager 128 may issue one or more commands to hypervisor 125 or host OS 120 to create the live snapshots. In one example, snapshot manager 128 may issue a query to secondary memory 180 to determine whether the storage device supports native snapshotting. In another example, snapshot manager 128 may obtain this information from hypervisor 125 or host OS 120.

Block 202 waits for one or more acknowledgment messages (ACKs) indicating that all of the live snapshots were successfully created. In one example, each of the N processes described above may receive a respective acknowledgment message (ACK) indicating that the live snapshot of the corresponding virtual machine was successfully created, while in another example, a single ACK may be received by snapshot manager 128 that indicates that all of the live snapshots were successfully created.

At block 203, while waiting for the ACK(s), outputs from VMs in the group to one or more external targets (e.g., a virtual machine outside the group, another computer system, etc.) are blocked (e.g., intercepted and not sent to external targets), but outputs communicated between VMs in the group are not blocked. At block 204, ACK(s) indicating that all of the live snapshots were successfully created are received.

At block 205, the live snapshots are stored in memory (e.g., main memory 170, secondary memory 180, etc.), and at block 206, outputs from VMs in the group to one or more external targets are unblocked. Block 207 waits (e.g., for a specified delay in implementations where snapshots are created periodically, for a particular event such as output from a VM in the group to an external target, etc.) and then execution continues back at block 201 for another iteration of the loop. It should be noted that in some examples, live snapshots that are created at each subsequent iteration of the loop may be represented as changes (or "deltas") with respect to the prior snapshots, while in some other examples, at each iteration of the loop the live snapshots may be created "from scratch" and the prior snapshots destroyed.

Figure 3:
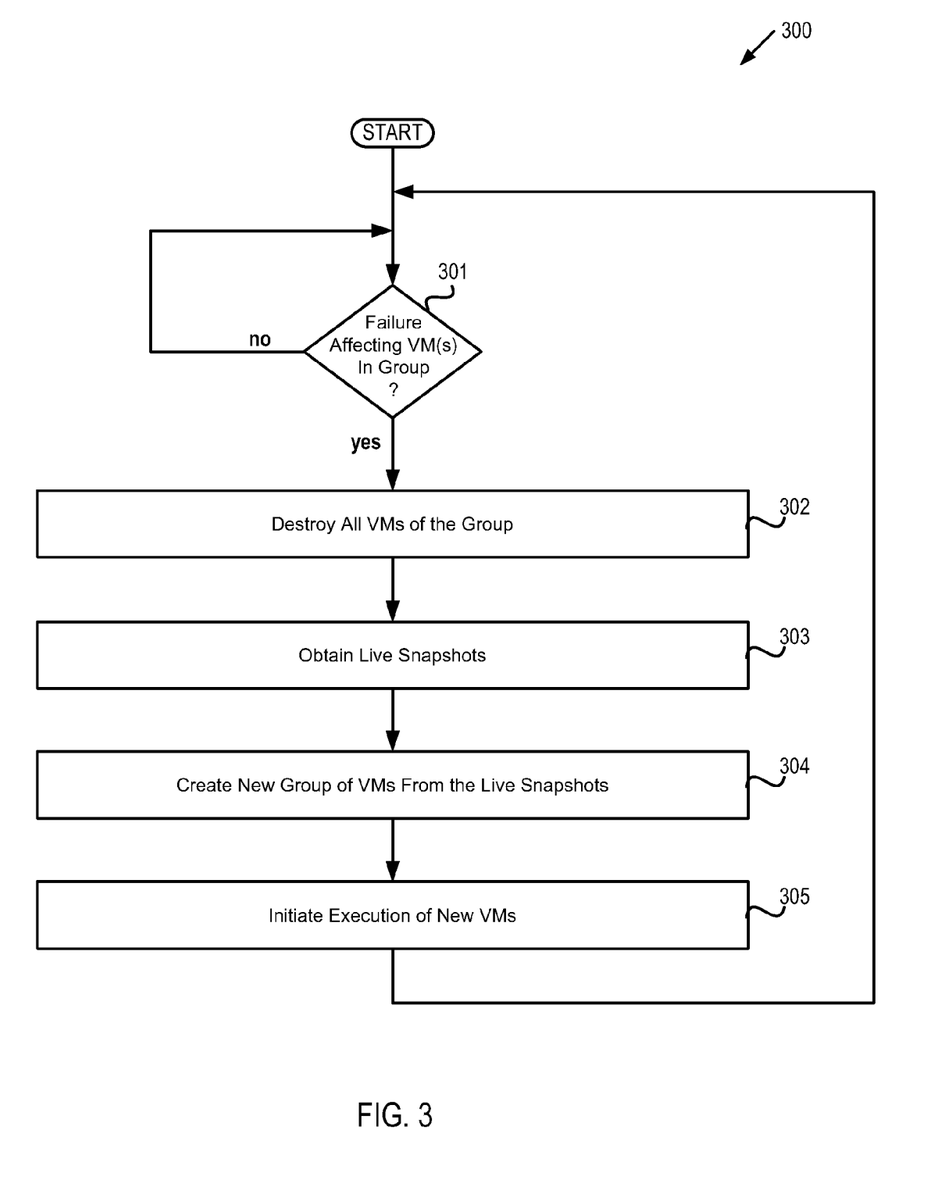
FIG. 3 depicts a flow diagram of one example of a method by which a computer system detects and handles failures affecting the execution of a group of virtual machines.

FIG. 3 depicts a flow diagram of one example of a method 300 by which a computer system detects and handles failures affecting the execution of a group of virtual machines. The method is performed by processing logic that may comprise hardware (circuitry, dedicated logic, etc.), software (such as is run on a general purpose computer system or a dedicated machine), or a combination of both. In one example, the method is performed by the computer system 100 of FIG. 1, while in some other examples, some or all of the method might be performed by another machine. Similarly, in one example the method is performed by failure manager 129, while in some other examples, some or all of the method might be performed by some other module of computer system 100. It should be noted that blocks depicted in FIG. 3 can be performed simultaneously or in a different order than that depicted.

Block 301 checks whether a failure (e.g., a hardware failure, a hypervisor failure, etc.) affecting the execution of one or more VMs in the group has occurred. If such a failure is detected, execution proceeds to block 302, otherwise block 301 is executed again. It should be noted that although the detection is implemented in method 300 as active polling, in some other examples the detection may be performed in an alternative manner (e.g., via a message to failure manager 129, etc.). In one example, failure manager 129 may spawn N processes, one for each virtual machine in the group, and each of the processes may monitor its respective virtual machine to determine whether it has been impacted by a failure.

At block 302 all of the virtual machines of the group are destroyed, and at block 303 the most recent successfully-created live snapshots of the VMs in the group are obtained (e.g., via a request from failure manager 129 to snapshot manager 128, etc.). In one example, the destruction of the VMs and obtaining of the most recent successfully-created live snapshots may be performed on a per-VM basis by the N processes described above (e.g., a first process of the N processes destroys a first VM of the group and obtains the most recent successfully-created live snapshot of the first VM, a second process of the N processes destroys a second VM of the group and obtains the most recent successfully-created live snapshot of the second VM, etc.).

At block 304, a new group of VMs is created from the live snapshots obtained at block 303, and at block 305 execution of the new VMs is initiated. In one example, blocks 304 and 305 may be performed on a per-VM basis by the N processes described above. After block 305, execution continues back at block 301, enabling detection and handling of a subsequent failure that affects the execution of one or more of the new virtual machines.

It should be noted that in some alternative implementations, a group of backup virtual machines may be employed. For example, a group of backup VMs may be created and placed in suspended mode (e.g., prior to execution of the methods of FIGS. 2 and 3, etc.) and continuously synced with the original group of VMs. Then when a failure occurs affecting one or more VMs in the original group, the backup virtual machines can be changed to a running state, rather than creating a new group of virtual machines from scratch.

Figure 4:
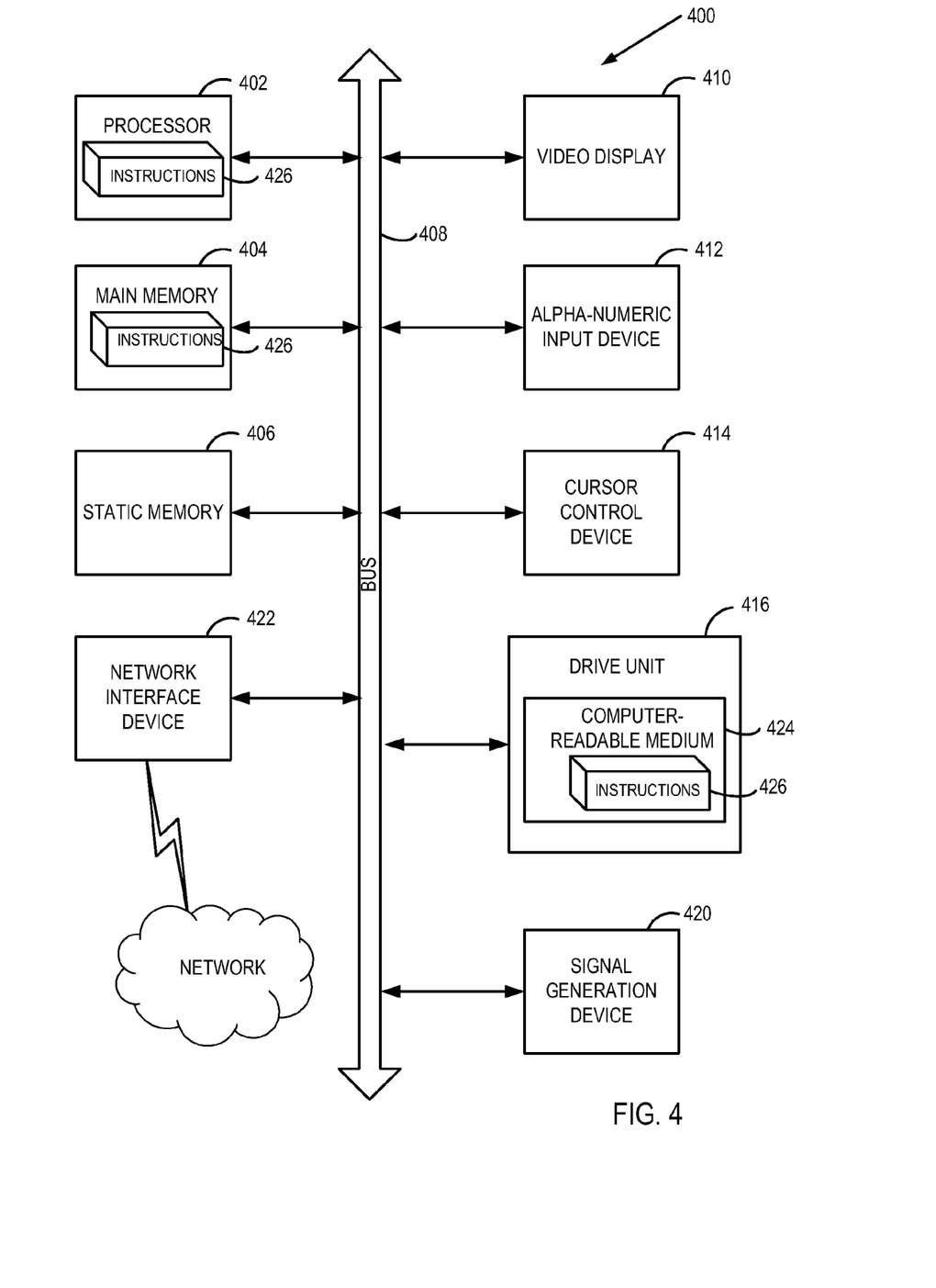
FIG. 4 depicts a block diagram of an illustrative computer system operating in accordance with examples of the invention.

FIG. 4 illustrates an illustrative computer system within which a set of instructions, for causing the machine to perform any one or more of the methodologies discussed herein, may be executed. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the methods of FIGS. 2 and 4, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "issuing", "determining", "destroying", "flushing", "freezing", "queueing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other examples will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
executing, by a computer system, a first virtual machine and a second virtual machine;

creating, by the computer system, a first live snapshot of the first virtual machine and a second live snapshot of the second virtual machine;
detecting, by the computer system, after the creating of the first live snapshot and the second live snapshot, a failure that affects the executing of the first virtual machine; and
in response to the detecting:
  destroying, by the computer system, the first virtual machine and the second virtual machine,
  creating, by the computer system, a third virtual machine from the first live snapshot and a fourth virtual machine from the second live snapshot, and
  initiating, by the computer system, execution of the third virtual machine and the fourth virtual machine;
wherein an output is transmitted by the first virtual machine to the second virtual machine during the creating of the first live snapshot and the second live snapshot; and
wherein the output is not blocked.

2. The method of claim 1 further comprising:
storing, by the computer system, the first live snapshot and the second live snapshot in a memory; and
receiving, via a hypervisor of the computer system, one or more messages indicating that the first live snapshot and the second live snapshot were successfully created.

3. The method of claim 2 wherein the hypervisor issues one or more commands to create the first live snapshot and the second live snapshot.

4. The method of claim 3 wherein the one or more commands comprises:
a first command that is issued by a first process to create the first live snapshot, and
a second command that is issued by a second process to create the second live snapshot;
and wherein the first process and second process execute concurrently.

5. The method of claim 4 wherein the one or more messages comprises:
a first message indicating that the first live snapshot was successfully created, and
a second message indicating that the second live snapshot was successfully created;
and wherein the first message is received by the first process and the second message is received by the second process.

6. The method of claim 1 wherein the failure is one of a hardware failure and a hypervisor failure.

7. The method of claim 1 wherein live snapshots of the first virtual machine and the second virtual machine are created periodically.

8. The method of claim 7 wherein when failure of the first virtual machine is determined, the first live snapshot is the most recent snapshot of the first virtual machine and the second live snapshot is the most recent snapshot of the second virtual machine.

9. The method of claim 1 wherein the first live snapshot is created by a host operating system of the computer system.

10. The method of claim 1 further comprising:
creating, by the computer system, a third live snapshot of the third virtual machine and a fourth live snapshot of the fourth virtual machine;
determining by the computer system, after the creating of the third live snapshot and the fourth live snapshot, that the third virtual machine has failed; and
in response to the determining:
  destroying, by the computer system, the third virtual machine and the fourth virtual machine,
  creating, by the computer system, a fifth virtual machine from the third live snapshot and a sixth virtual machine from the fourth live snapshot, and
  initiating, by the computer system, execution of the fifth virtual machine and the sixth virtual machine.

11. An apparatus comprising:
a memory; and
a processor, coupled to the memory, to:
  execute a first virtual machine and a second virtual machine,
  create a first live snapshot of the first virtual machine and a second live snapshot of the second virtual machine,
  store the first live snapshot and the second live snapshot in the memory,
  detect, after the storing of the first live snapshot and the second live snapshot, a failure that affects the executing of the first virtual machine, and
  in response to the detecting:
    destroy the first virtual machine and the second virtual machine,
    create a third virtual machine from the first live snapshot and a fourth virtual machine from the second live snapshot, and
    initiate execution of the third virtual machine and the fourth virtual machine;
wherein an output is transmitted by the first virtual machine to the second virtual machine during the creating of the first live snapshot and the second live snapshot; and wherein the output is not blocked.

12. The apparatus of claim 11 wherein the processor is further to receive one or more messages indicating that the first live snapshot and the second live snapshot were successfully created.

13. The apparatus of claim 12 wherein the processor is further to execute a hypervisor, and wherein the processor is further to issue, via the hypervisor, one or more commands to create the first live snapshot and the second live snapshot.

14. The apparatus of claim 13 wherein the failure is one of a hardware failure and a failure of the hypervisor.

15. The apparatus of claim 11 wherein the first virtual machine and the second virtual machine belong to a group, and wherein live snapshots of the first virtual machine and the second virtual machine are created at a plurality of points in time in response to outputs from the first virtual machine and the second virtual machine to one or more entities outside the group.

16. A non-transitory computer readable storage medium, having instructions stored therein, which when executed, cause a computer system to perform operations comprising:
executing, by the computer system, a first virtual machine and a second virtual machine;
creating by the computer system, at a first time, a first live snapshot of the first virtual machine and a second live snapshot of the second virtual machine;
creating by the computer system, at a second time that is after the first time, a third live snapshot of the first virtual machine and a fourth live snapshot of the second virtual machine;
detecting by the computer system, after the creating of the third live snapshot and the fourth live snapshot, a failure that affects the executing of the first virtual machine; and
in response to the detecting:
  destroying, by the computer system, the first virtual machine and the second virtual machine,
  creating, by the computer system, a third virtual machine from the third live snapshot and a fourth virtual machine from the fourth live snapshot, and initiating, by the computer system, execution of the third virtual machine and the fourth virtual machine;

wherein an output is transmitted by the first virtual machine to the second virtual machine during the creating of the first live snapshot and the second live snapshot; and wherein the output is not blocked.

17. The non-transitory computer readable storage medium of claim 16 wherein the operations further comprise receiving, via a hypervisor of the computer system, one or more messages indicating that the first live snapshot and the second live snapshot were successfully created; and wherein the hypervisor issues one or more commands to create the first live snapshot and the second live snapshot, and wherein there is a delay between the issuing of the one or more commands and the receiving of the one or more messages, and wherein the output is transmitted during the delay.

18. The non-transitory computer readable storage medium of claim 16 wherein the operations further comprise:

destroying the first live snapshot and the second live snapshot after the creating of the third live snapshot and the fourth live snapshot.

19. The non-transitory computer readable storage medium of claim 16 wherein the third live snapshot is a delta with respect to the first live snapshot and the fourth live snapshot is a delta with respect to the second live snapshot.

20. The non-transitory computer readable storage medium of claim 16 wherein the first virtual machine and the second virtual machine belong to a group, and wherein the third live snapshot and the fourth live snapshot are created subsequent to an output from one of the first virtual machine and the second virtual machine to an entity outside the group.

* * * * *